(12) United States Patent
Clausen et al.

(10) Patent No.: US 9,473,490 B2
(45) Date of Patent: Oct. 18, 2016

(54) BIDIRECTIONAL AUTHENTICATION

(71) Applicants: Christopher Phillip Clausen, Novato, CA (US); Lisa Michelle Lepage, Charlotte, NC (US); Darrell Lee Suen, San Ramon, CA (US); Jeffrey A. Cornman, San Francisco, CA (US)

(72) Inventors: Christopher Phillip Clausen, Novato, CA (US); Lisa Michelle Lepage, Charlotte, NC (US); Darrell Lee Suen, San Ramon, CA (US); Jeffrey A. Cornman, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 14/512,911

(22) Filed: Oct. 13, 2014

(65) Prior Publication Data

US 2016/0105425 A1    Apr. 14, 2016

(51) Int. Cl.
*H04L 29/06*    (2006.01)
*G06Q 50/26*    (2012.01)
*G06Q 10/10*    (2012.01)

(52) U.S. Cl.
CPC ........... *H04L 63/0838* (2013.01); *G06Q 10/10* (2013.01); *G06Q 50/265* (2013.01)

(58) Field of Classification Search
None
See application file for complete search history.

(56) References Cited

U.S. PATENT DOCUMENTS

| 4,720,860 A | * | 1/1988 | Weiss | G06F 7/582 380/28 |
| 4,856,062 A | * | 8/1989 | Weiss | G06F 21/34 713/184 |
| 4,885,778 A | * | 12/1989 | Weiss | G06F 7/582 235/382 |

(Continued)

FOREIGN PATENT DOCUMENTS

| KR | 101206072 B1 | 11/2012 |
| NL | 1019440 C2 | 11/2001 |

(Continued)

OTHER PUBLICATIONS

Welil Han, et al.; Fudan Univ., Shanghai, China; Anti-phishing by smart mobile device; IFIP International Conference on Network and Parallel Computer Workshops, Sep. 18-21, 2007, Liaoning, China; Publisher: IEEE, Piscataway, NJ, USA.

(Continued)

*Primary Examiner* — Christopher Revak
(74) *Attorney, Agent, or Firm* — Walter | Haverfield LLP; James J. Pingor (57) ABSTRACT

Systems, methods, and other embodiments associated with bidirectional authentication are described herein. According to one embodiment, a method includes a user receiving a communication from an entity. In response to receiving the communication from the entity, the method further includes generating a token. The token may be a one-time passcode, personal identification number (PIN), alphanumeric value, code word, pass phrase, or security question. The token is received by a device of the user. Additionally, the token is transmitted to the entity. The user may then receive evidence of the token from the entity.

20 Claims, 5 Drawing Sheets

(56) References Cited

U.S. PATENT DOCUMENTS

| | | | |
|---|---|---|---|
| 6,012,144 A * | 1/2000 | Pickett | G06Q 20/04 380/33 |
| 6,067,621 A * | 5/2000 | Yu | G06F 21/34 713/168 |
| 6,707,915 B1 | 3/2004 | Jobst et al. | |
| 6,934,858 B2 * | 8/2005 | Woodhill | G06F 21/313 726/5 |
| 7,363,494 B2 * | 4/2008 | Brainard | G06Q 20/32 380/232 |
| 8,315,595 B2 | 11/2012 | Murphy et al. | |
| 8,677,116 B1 | 3/2014 | Bicer | |
| 2006/0120607 A1 * | 6/2006 | Lev | G06K 9/00624 382/217 |
| 2008/0046988 A1 | 2/2008 | Baharis et al. | |
| 2008/0075281 A1 * | 3/2008 | Zeng | G06F 21/33 380/44 |
| 2011/0138175 A1 * | 6/2011 | Clark | H04L 51/12 713/168 |
| 2011/0289572 A1 * | 11/2011 | Skeel | H04L 9/3271 726/7 |
| 2012/0172067 A1 | 7/2012 | Gillin | |
| 2012/0295580 A1 | 11/2012 | Corner | |
| 2012/0324568 A1 | 12/2012 | Wyatt et al. | |
| 2013/0006848 A1 | 1/2013 | Kuttuva | |
| 2013/0055346 A1 * | 2/2013 | Singh | G06F 21/34 726/3 |
| 2013/0080276 A1 | 3/2013 | Granbery | |
| 2013/0227677 A1 * | 8/2013 | Pal | G06F 21/33 726/19 |
| 2013/0326605 A1 * | 12/2013 | Betz | G06F 21/31 726/7 |
| 2014/0189841 A1 * | 7/2014 | Metke | G06F 21/40 726/9 |

FOREIGN PATENT DOCUMENTS

| | | |
|---|---|---|
| TW | 200941410 A | 10/2009 |
| TW | 201101215 A | 1/2011 |
| WO | 2013133763 A1 | 9/2013 |

OTHER PUBLICATIONS

R. Balakrishna, et al; Secure authenticated key exchange protocol for credential services; DESIDOC Journal of Library & Information Technology, v 29, n 3, 49-53, May 2009; ISSN: 0974-0643; Publisher: Defence Scientific Information and Documentation Centre, India.

* cited by examiner

BIDIRECTIONAL AUTHENTICATION

BACKGROUND

Increasingly businesses, financial institutions, and other entities are contacting their users (e.g., individuals, customers, account holders, corporate customer, subscribers, business, organization, other entity, etc.) regarding products and services that the entities offer. Furthermore, entities are taking advantage of the many digital channels (e.g., mobile network, telephone lines, digital subscriber lines (DSL), WiFi network, local area network, wireless network, wide area network, etc.) that can be used to contact users. For example, an agent of a financial institution may telephone a user to determine if the user has recently made a large financial transaction using a specific account. Users may prefer to conduct business remotely using a digital channel rather than having to travel to a physical location of the entity, even if conducting business at a physical location of the entity is more secure. Accordingly, users are becoming increasingly complacent about answering questions regarding their business relationship with an entity over digital channels even if the user is unfamiliar with the individual calling on the entity's behalf.

The increasing use of digital channels gives fraudsters an opportunity to take advantage of users. For example, as users become accustomed to answering questions that may involve personal data, fraudsters are increasingly reaching out to users purporting to be an agent of an entity that the user conducts business with. While savvy users may be wary of revealing personal data, fraudsters prey on the helplessness of a user to verify that the individual is in fact an agent of the entity.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

As discussed above, users enjoy the convenience of being able to conduct business remotely using digital channels. For example, an entity may be a financial institution that offers products and services such as bank accounts and account protection respectively. A user may be a customer having an account at the financial institution. In order to conduct business remotely, the entity employs agents that are empowered to contact the users on behalf of the entity. However, due to the sheer size of some entities, the user may be unfamiliar with each agent that contacts the user about the user's activity. Furthermore, the typical discussion between an agent and a user may involve the user revealing personal data (e.g., social security number, routing number, account number, address information, etc.).

Described herein are examples of systems, methods, and other embodiments associated with bidirectional authentication such that the agent has an opportunity to authenticate the user and the user likewise has an opportunity to authenticate the agent as being affiliated with the entity. In one embodiment, the user is contacted by an individual purporting to be an agent of an entity known to the user. The user is contacted via a digital channel. For example, the user may receive a telephone call, internet, voicemail, email, short message service (SMS) message, text image, and so on.

In response to the user receiving the contact, the user employs a device, such as a mobile telephone, to generate a token. Suppose that the user receives a voicemail from an individual that identifies himself or herself as an agent of user's bank. Using the device, the user may access an interface that causes the device to generate a token. In one embodiment, the interface may be a web-based application ("app") that facilitates communication between the device and the entity. By accessing the app the user is able to use the device to generate a token. Alternatively, the device may monitor the user's communication and automatically generate a token in response to receiving the contact.

Both the device and the entity receive the generated token. The user has access to the token via the device. The entity may authenticate the user using information from the token. For example, the entity may be able to identify the user as a known user of the entity. Likewise, the individual purporting to be an agent of the entity has access to the token via the entity. Because both the device and entity receive the token, the user can validate the individual's identity as an agent of the entity, by requesting that the individual present evidence of the received token. In the example given above, the user receives a phone call from an individual purporting to be an agent. In response to receiving the phone call, the device generates a token. Suppose that the token is a code word. The generated token is received by the device and entity. The user may then request that the individual recite the code word. If the individual can recite the code word, the individual is an agent of the entity because only the user and an agent would have access to the code word. Thus, the user can verify the identity of the agent. Allowing the user to verify the agents as being associated with the entity reduces the ability of fraudsters to imitate agents of entities in order to perpetrate fraud.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with bi-directional authentication.

Figure 1:
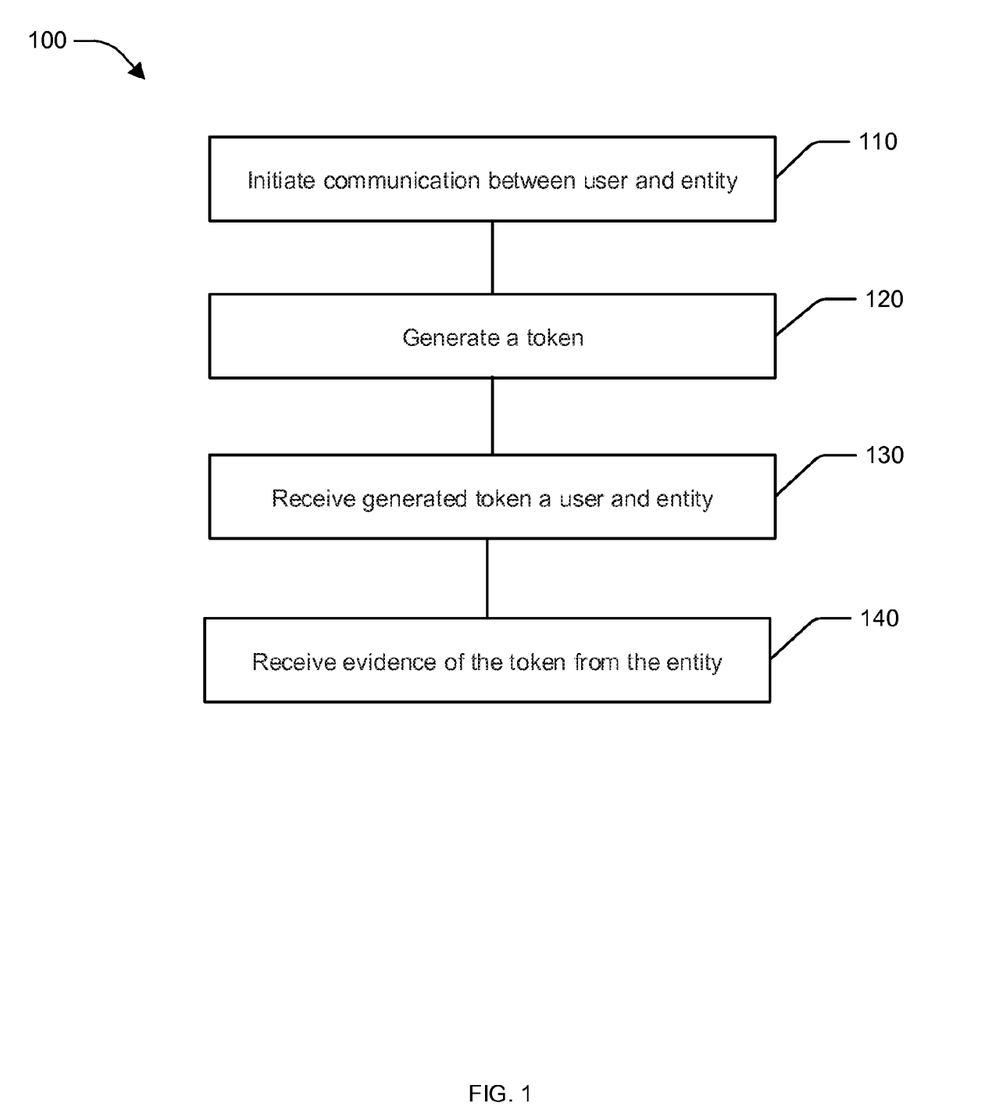
FIG. 1 illustrates one embodiment of a method associated with bidirectional authentication.

FIG. 1 is an illustration of an example method 100 associated with bidirectional authentication. At 110 communication between a user (e.g., individuals, customers, account holders, corporate customer, subscribers, business, organization, other entity, etc.) and the entity is initiated. In one embodiment, the entity employs a number of agents that contact the user on behalf of the entity. As discussed above, an agent may contact the user concerning a number of business concerns related to the services and products that the entity offers and maintains for its customers. For example, the entity may be a financial institution and the agent may be a banker employed by the financial institution. The contact may be made using a digital channel (phone, email, online chat, website, app, SMS message, text message, etc.).

In another embodiment, the user may contact the entity. For example, the user may contact the entity to express concerns with a product or service that the entity provides for the user. Although the user contacted the entity, the user may still wish to verify that the user is communicating with an agent of the entity. For example, the user may become concerned that they have contacted the entity by mistake, or that a fraudster is impersonating an agent of the entity. Consider that the user attempts to contact an agent of the entity, and becomes concerned that he or she has contacted an impersonator. Accordingly, the user may wish to verify that the individual is in fact an agent of the entity.

In response to the contact between the user and the entity or an agent thereof, a token is generated at 120. The token is a code that the user uses to verify the identity of the individual purporting to be an agent of the entity. For example the token may be a personal identification number (PIN), alphanumeric value, code word, pass phrase, one time password, gestured based prints, acoustic based prints or forensics, images, etc. In another embodiment, the token is a security question with a predetermined response.

The token may include information such as device data and user data. For example, the device data may include information about the device such as subscriber identity module (SIM) card number, serial number, metadata identifying the device, geolocation data for the device, etc. The user data may include information about the user (e.g., serial number, social security number, account number, biometric data, metadata identifying the user, etc.).

In response to a communication being received at a device of the user, the device may automatically generate a token. For example, consider that the mobile device of user includes a directory identifying certain phone numbers as possibly being associated with an entity. The device may be configured such that if a call is received from a number in the directory, a token is automatically generated. Additionally or alternatively, the user may select a functionality to generate a token. For example, the user may activate a web based application or "app." The app may have a feature allowing the user to select a button in order to generate a token.

In another embodiment, the device may not possess the functionality to generate a token. Instead, the device may be used to make a request that a token be generated by a third party or the entity. Consider that in response to a user receiving a call from an individual purporting to be an agent of an entity that the user uses an app on the device to request that a token be generated. The entity would then generate the token in response to receiving the request from the device of the user.

At 130, both the user, via the device, and the entity receive the token. In the embodiment in which the device generates the token, the device accordingly has the token. Alternatively, in the embodiment in which the device requests a token, the token may be received by the device via a digital channel. The initial communication of 110 may be conducted on a first digital channel. For example, the initial communication may be received via email on a laptop. The token may be received via a second digital channel that is different from the first channel. Thus, while the initial communication is performed via email, the token may be received via an SMS message. Accordingly, the user may identify a preference for how tokens are to be received.

As discussed above, the entity also receives the token. In one embodiment, the entity receives information about the user and/or the device that allows the entity to identify the user that generated the token. For example, in addition to receiving the token, an entity may receive device data that links the device to a particular user. Thus, the entity is able to identify the user based on the device data. In one embodiment, the entity may compare the device data to a database of users' device data in order to identify a user associated with the device. In this manner, the entity is able to verify the user's identity based on the user's association with a device. The entity may also take action based on the generated token. For example, in one embodiment the initial communication regards a proposed business transaction. When the user is prepared to discuss the matter further, the user generates a token. In response to receiving the token, the entity may pre-stage the transaction so that an agent of the entity will have access to information regarding the proposed transaction.

At 140, the user receives verification of the token from the entity. For example, the user may query the entity for the token and receive a communication from the entity with the evidence of the token. Accordingly, when the entity is subsequently in contact with the user, the user is able to verify the entity's identity by querying the entity for the token. Because the entity received the same generated token as the user, the entity can use the token as a sort of password. In this manner, the user is able to receive evidence of the token such as a communication containing the token, a portion of the token, a correct response to the token. Accordingly, the user is able to verify of the identity of the agent that initiated contact as a trusted agent of the entity.

Figure 2:
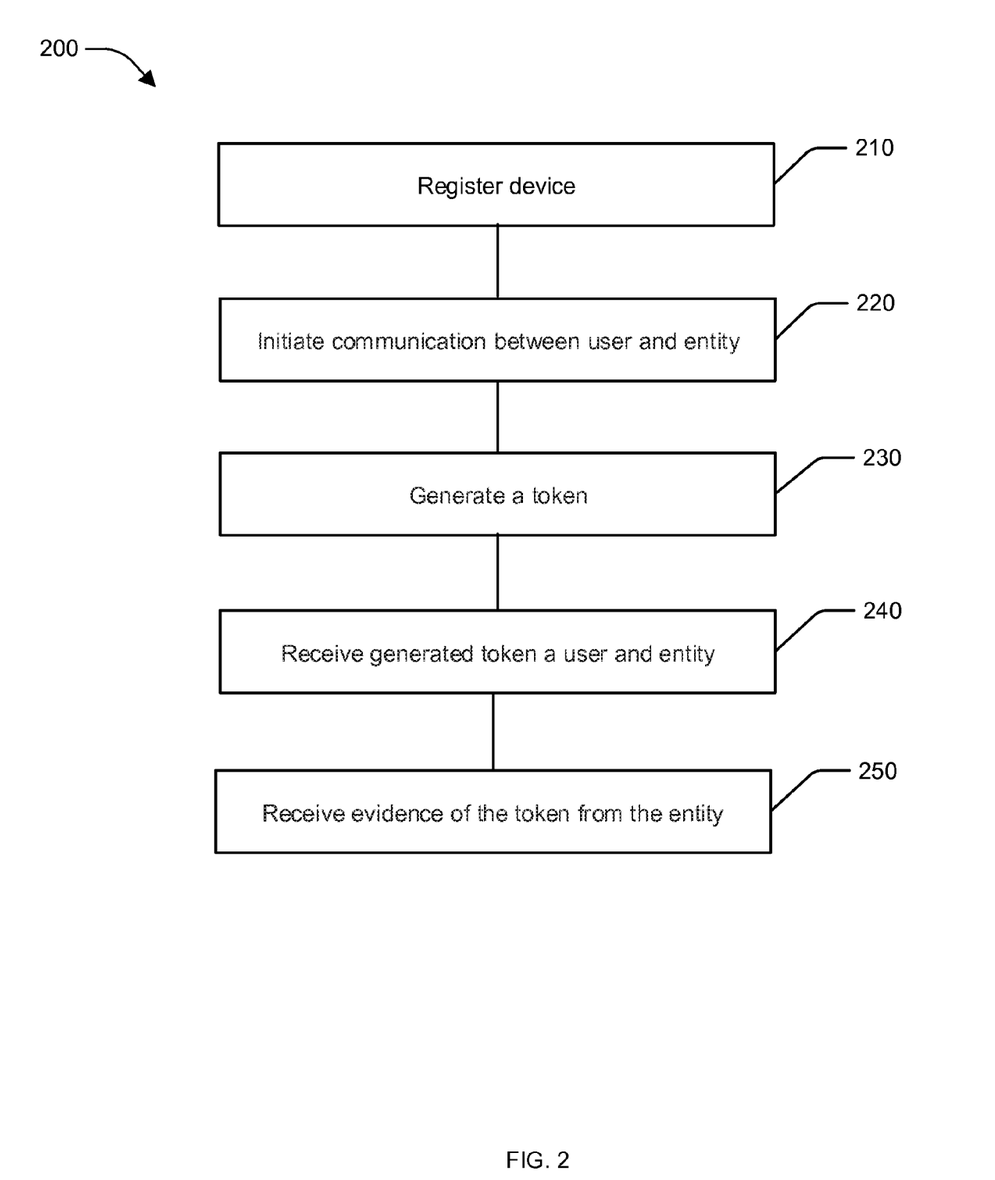
FIG. 2 illustrates one embodiment of a method associated with registration in bidirectional authentication.

FIG. 2 illustrates one embodiment of a method 200 associated with bidirectional authentication. Steps 220, 230, 240, and 250 operate in a similar manner as steps 110, 120, 130, and 140, respectively, as described with respect to FIG. 1. Method 200 begins at 210 in which a device becomes registered by entity. By becoming registered, the user formalizes his or her relationship with the entity such that the entity can identify the user as being known. In one embodiment, the relationship between the user and the entity further includes associating a known user with a device. Thus, an entity may be able to identify a user based on a device bound to the user.

In one embodiment, a device becomes registered when the device is used to access a digital tool of the entity. For example, the entity may provide an app that allows a user to access certain services and tools offered by the entity. A user may access the app using a number of different devices (e.g., tablet, smart phone, wearable device, etc.). The device may receive a prompt to register the device when the app is initially accessed. If the device is not initially registered, subsequent attempts to access the entity via such tools may also result in a prompt to register the device. Accordingly, a device may receive a prompt to be registered in response to accessing a tool via a digital channel.

In another embodiment, the entity may desire to communicate with a user using a secure communication channel. To establish a secure communication channel with the device of the user, the entity may notify user via the device to indicate the presence of an established secured trusted environment. For example, the device may be able to produce a secured trusted environment capable of supporting communication between the entity and user. The user may then activate communication with the entity from the device. For example, the entity may contact the user through the secured trusted environment using an app, voice over internet protocol (VoIP), secure video conferencing, chat interface, and so on. Accordingly, secure communications between the entity and the user can be enabled.

In another embodiment, the device may generate a registration object that contains user and/or device data. The device may be configured to transfer the registration object to an entity via a digital channel. A user may initiate transfer of the registration object when the user anticipates using services or products of the entity. Furthermore, an entity may allow registered users to have more access to tools, services, products, incentives, promotions than an unregistered user. Accordingly, the registration may be instigated by either the user or the entity.

During the registration process, the entity may attempt to receive user data and device data such that the entity can identify the user in transactions. For example, suppose that a user registers a device, which is a mobile phone. To register the mobile device the user downloads an app of the entity to the device. By virtue of downloading the app the device shares user and/or device data with the entity. The entity uses the user data and/or device data to identify the user. For example, when a communication is received from the device, the entity identifies the user associated with the device by comparing the metadata associated with the communication to the user data and/or device data received during registration. Accordingly, the entity can recognize users based on user data, device data, or a combination thereof.

Figure 3:
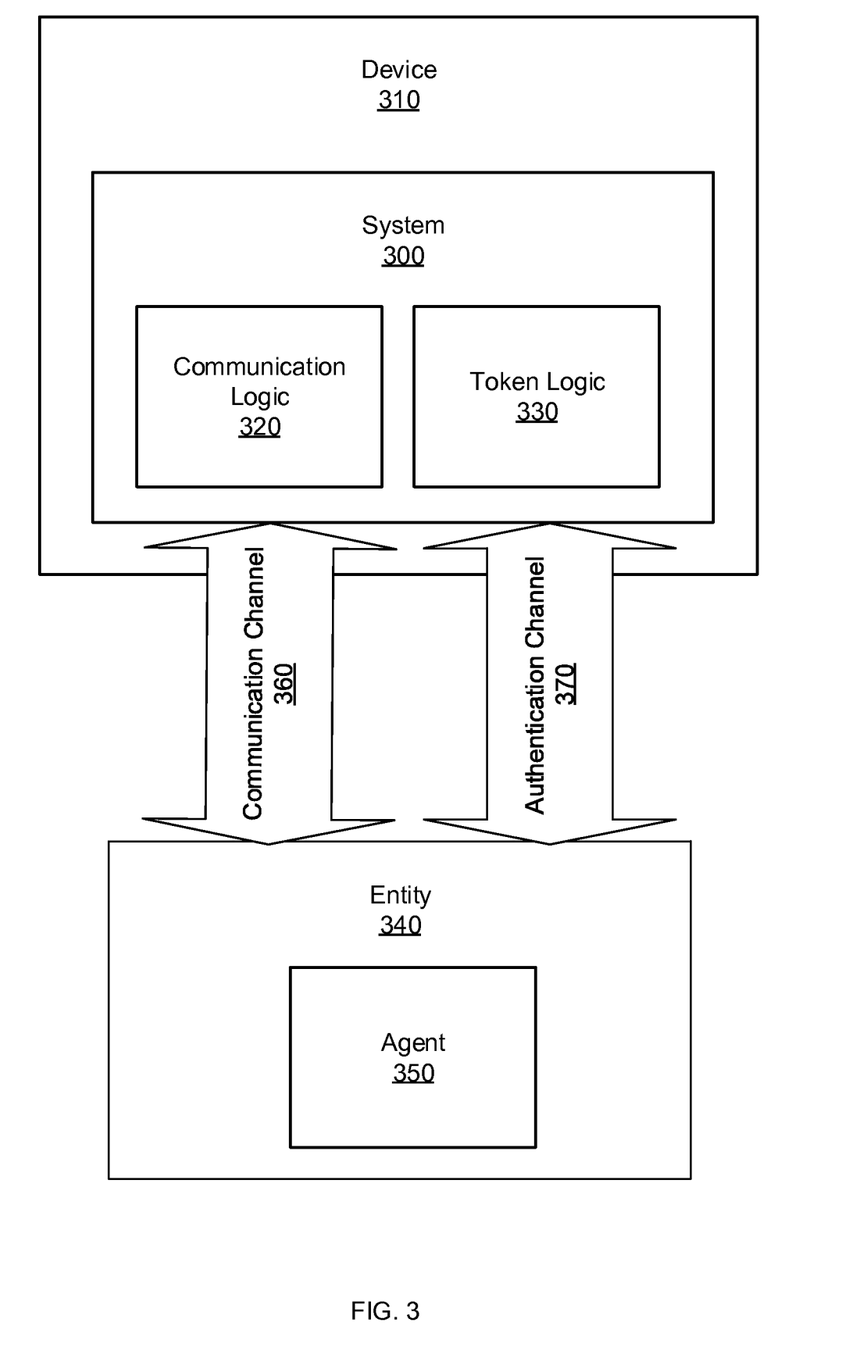
FIG. 3 illustrates one embodiment of a system associated with bidirectional authentication.

FIG. 3 is an illustration of an embodiment of a system 300 associated with bidirectional authentication. In one embodiment, the system 300 is a component of a device 310. For example, as discussed above, the user may have a device 310 such as a tablet, smart phone, wearable device etc. The system 300 may be integrated with the device 310. For example, the system 300 may be integrated with an integrated chip, system on chip (SOC), and so on. Alternatively, the system 300 may be an executable program to be run in conjunction with the device 310. In this embodiment, system 300 may not be a portion of the device 310. Instead, the system 300 is configured to operate separately from the device 310.

The system 300 includes a communication logic 320 and a token logic 330. The communication logic 320 manages communication between the system 300 and the entity 340. As discussed above, the entity 340 may have at least one agent 350. The agent 350 conducts communication on behalf of the entity 340. In another embodiment, the entity 340 itself may conduct communication with the system 300. Communication between the system 300 and the entity 340 is conducted over a communication channel 360. For example, the communication may be a phone call completed over a communication channel 360 such as a cellular network. In response to the communication, a user may use the device 310 to generate a token. In response the token being generated by the token logic 330 of the device 310, the token is received by the user because the token was generated by the device 310 and the entity 340 through an authentication channel 370.

In one embodiment, the token logic 330 is configured to send a token to the entity when the device 310 is within a specific radius of the entity 340, so that the entity 340 can recognize the user. For example, the device 310 may have access to the location of different physical locations (e.g., bank branches) of the entity. Further, the device 310 may employ geolocation services such that the device generates a notification when the device is within a predetermined radius of the physical location of the entity. In response to generating a notification, the device 310 may send a token to the entity 340. Accordingly, the entity can recognize that a user is likely to visit the physical location.

In one embodiment, the communication channel 360 and the authentication channel 370 utilize the same digital channel. For example, both the communication channel 360 and the authentication channel 370 may utilize a cellular network. In another embodiment, the communication channel 360 and the authentication channel 370 utilize different channels. For example, while the communication channel may utilize the cellular network, the token logic 330 may be configured to transmit tokens to the entity 340 via email using the internet as the authentication channel 370. In one embodiment, the token logic 330 defines a single digital channel as the authentication channel 370. For example, a token may be may be transmitted to the entity via a specified digital channel. Consider that the specified digital channel is not available to transmit the token. For example, suppose the digital channel is the internet, but the device does not have access to WiFi. The token logic 330 may be further configured to select an alternative digital channel. In this manner the token logic 330 may define a hierarchy of digital channels, such that a first digital channel is the preferred digital channel. A second digital channel may be specified by the token logic 330. Upon determining that the first digital channel is not available, the token logic 330 may utilize the second digital channel as the authentication channel 370. Thus, token logic may set the authentication channel 370.

The communication logic 320 may define the digital channel to be used for communication with the entity 340. The communication logic 320 may define digital channels to be used for communication with the entity 340. Specifying digital channels for communication reduces the opportunity for fraud. For example, if the communication logic 320 defines a cellular digital channel as the communication channel 360, communications received over other digital channels may be considered fraudulent.

Figure 4:
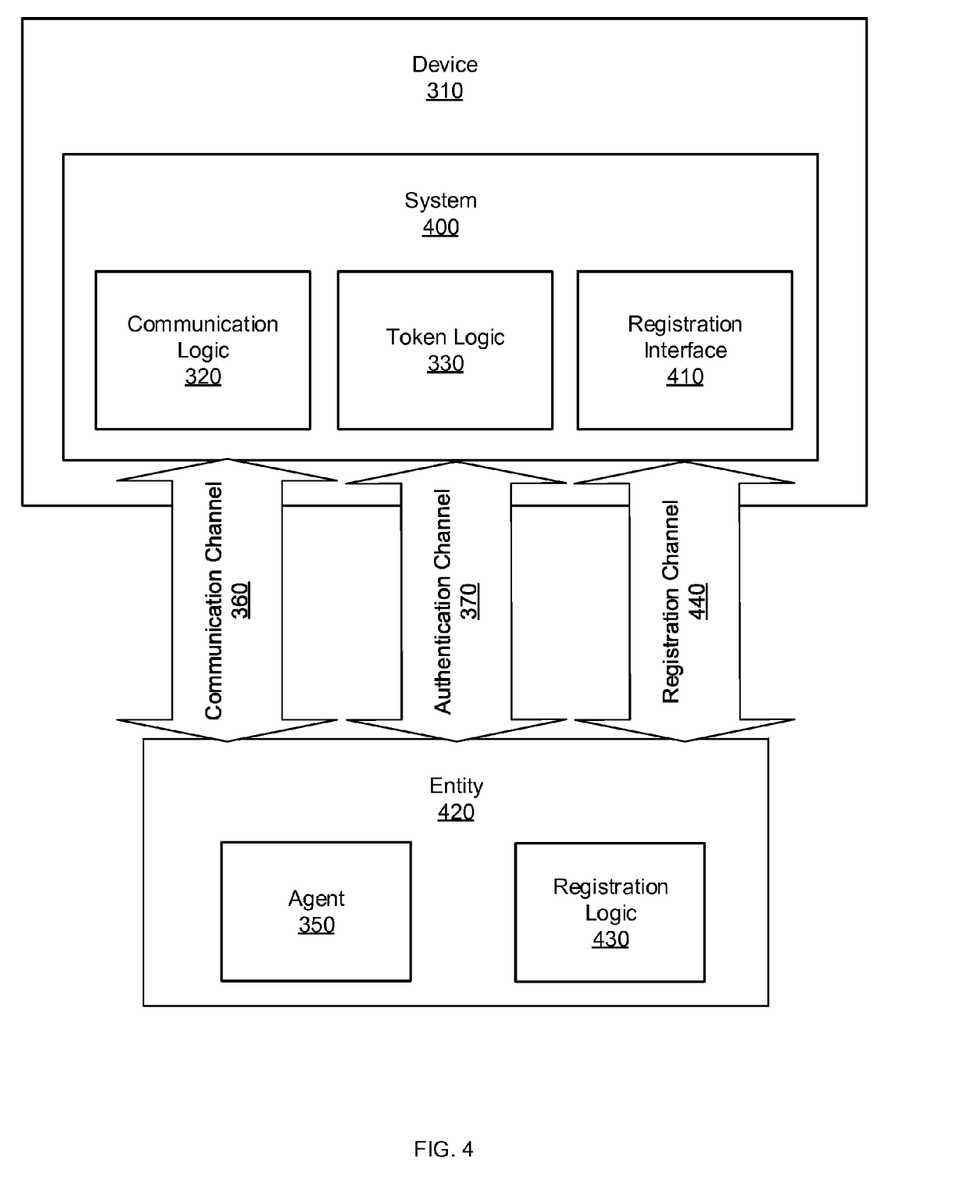
FIG. 4 illustrates one embodiment of a system associated with bidirectional authentication having a registration interface.

FIG. 4 is an illustration of an embodiment of a system 400 associated with bidirectional authentication. The device 310, the communication logic 320, the token logic 330, the agent 350, the communication channel 360, and the authentication channel 370 operate in a similar manner as described above with respect to FIG. 3. The system 400 further includes a registration interface 410. The entity 420 operates in a similar manner as the entity 340 described above with respect FIG. 3. The entity 420 further includes a registration logic 430. The system 400 communicates with the entity 420 via the registration channel 440.

In one embodiment, the registration interface 410 allows a user to register the device 310. As discussed above, the registration interface 410 may be an app. Alternatively, the registration interface 410 may be a web-based java applet. Specifically, a user may access the registration interface 410 to transmit data such as user data and device data to the entity 420. Thus, the registration interface 410 allows the user to input data to be transmitted to the entity 420 so that the device may be registered. In one embodiment, the device 310 becomes registered when the registration interface 410 transmits registration data to the registration logic 430 of the entity 420. The registration interface 410 may generate a registration object that contains user and/or device data. The registration object is received by the registration logic 430 via the registration channel 440.

In one embodiment, the registration logic 430 of the entity 420 stores the registration data. When the entity 420 receives a token having information about the user, the registration logic 420 identifies the user that generated the token. Alternatively, as discussed above, the entity 420 may generate the token in response to receiving a request for a token from the device 310. The request includes information about a user. The registration logic 430 identifies the user requesting the token using the information about the user included in the request. For example, the registration logic 430 may compare the information about the user to the registration data. In this manner, the entity is able to authenticate the user by determining that the user and the entity 430 have a formalized relationship. As discussed above, based on the generated token the user can verify the identity of the entity. Thus, the systems and methods described herein describe bidirectional authentication.

Figure 5:
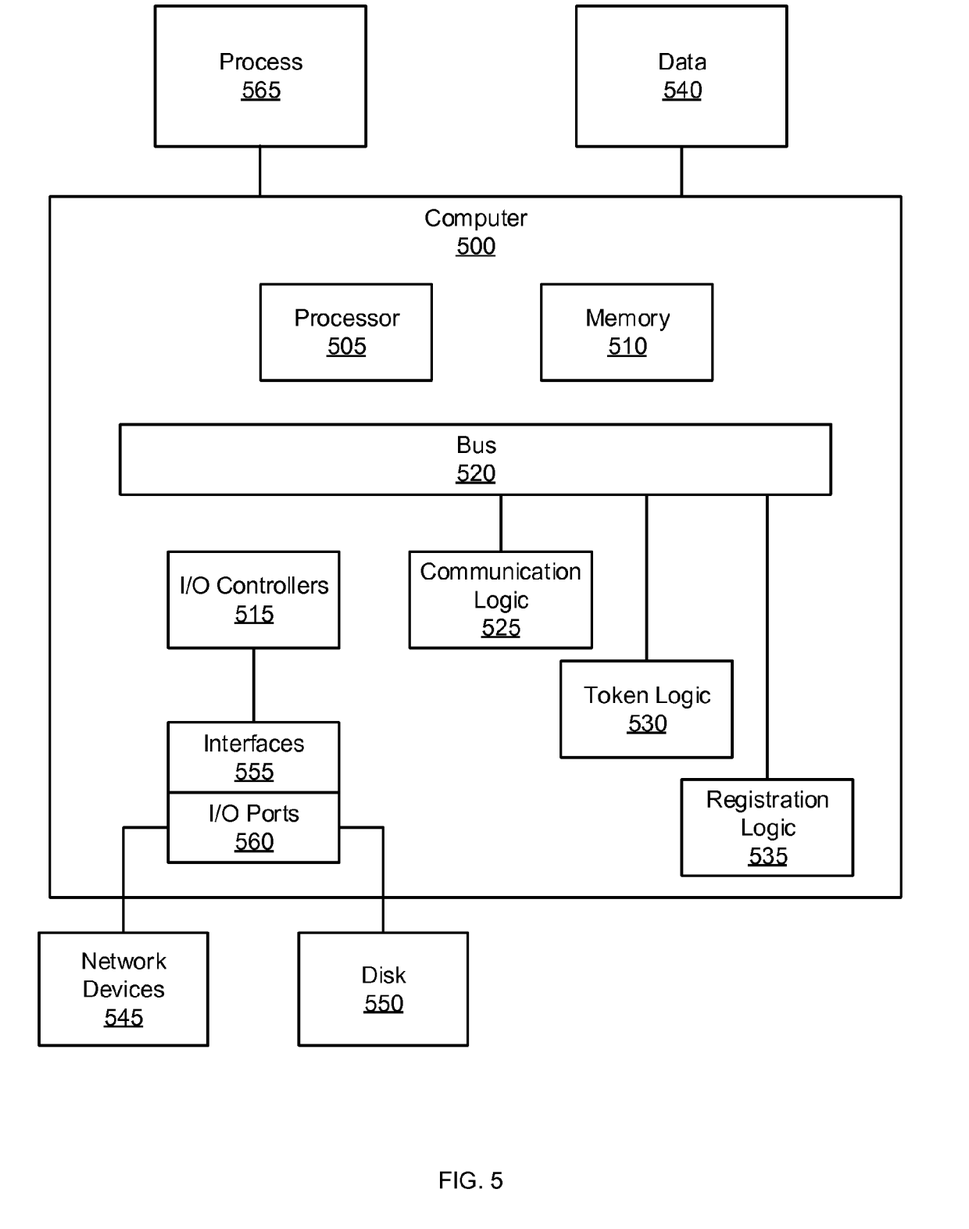
FIG. 5 illustrates one embodiment of an example computer environment associated with bidirectional authentication.

FIG. 5 illustrates one embodiment of an example computer environment associated with intelligent authentication. The computer environment in which the systems and methods described herein, and equivalents, may operate may include a computer 500. The computer includes a processor 505, a memory 510, and input/output (I/O) ports 515 operably connected by a bus 520. In one example, the computer 500 may include a communication logic 525, a token logic 530, and a registration logic 535. The communication logic 525 is configured to facilitate communication between a user and entity. The token logic 530 is configured to generate a token. Additionally or alternatively, the token logic 530 may be configured to request a token from the entity or a third party. The token logic 530 may be further configured to facilitate the user and the entity receiving the generated token. The registration logic 535 is configured to facilitate formalizing the relationship between the user and the entity.

In different examples, the communication logic 525, the token logic 530, and the registration logic 535 may be implemented in hardware, a non-transitory computer-readable medium with stored instructions, firmware, and/or combinations thereof. While the communication logic 525, the token logic 530, and the registration logic 535 are illustrated as hardware components attached to the bus 520, it is to be appreciated that in one example, the communication logic 525, the token logic 530, and/or the registration logic 535 could be implemented in the processor 505. Moreover, an activity log accessed by the token logic 530 may be stored in the memory 510.

In one embodiment, communication logic 525 is a means (e.g., hardware, non-transitory computer-readable medium, firmware) receiving communication from the entity. The token logic 530 is a means (e.g., hardware, non-transitory computer-readable medium, firmware) for generating a token. The registration logic 535 is a means (e.g., hardware, non-transitory computer-readable medium, firmware) for registering a device with the entity. The means may be implemented, for example, as an application specific integrated circuit (ASIC) programmed to facilitate data editing in a web-based interactive web response system. The means may also be implemented as stored computer executable instructions that are presented to computer 500 as data 540 that are temporarily stored in memory 510 and then executed by processor 505.

Generally describing an example configuration of the computer 500, the processor 505 may be a variety of various processors including dual microprocessor and other multi-processor architectures. The memory 510 may include volatile memory and/or non-volatile memory. Non-volatile memory may include, for example, ROM, PROM, and so on. Volatile memory may include, for example, RAM, SRAM, DRAM, and so on.

Network device 545 and a disk 550 may be operably connected to the computer 500 via, for example, an I/O interfaces (e.g., card, device) 555 and an I/O ports 560. The disk 545 may be, for example, a magnetic disk drive, a solid state disk drive, a floppy disk drive, a tape drive, a Zip drive, a flash memory card, a memory stick, and so on. Furthermore, the disk 545 may be a CD-ROM drive, a CD-R drive, a CD-RW drive, a DVD ROM, and so on. The memory 510 can store data 540 and/or a process 565, for example. The disk 550 and/or the memory 510 can store an operating system that controls and allocates resources of the computer 500.

The bus 520 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 520 can be types including, for example, a memory bus, a memory controller, a peripheral bus, an external bus, a crossbar switch, and/or a local bus.

The computer 500 may interact with I/O devices via the I/O interfaces 555 and the I/O ports 560. Input/output devices may be, for example, a keyboard, a microphone, a pointing and selection device, cameras, video cards, displays, the network devices 545, the disk 550, and so on. The I/O ports 560 may include, for example, serial ports, parallel ports, and USB ports.

The computer 500 can operate in a network environment and thus may be connected to the network devices 545 via the I/O interfaces 555, and/or the I/O ports 560. Through the network devices 545, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method, comprising:
   receiving, by a device comprising a processor, a communication request from a server associated with a financial institution entity;
   collecting, by the device, biometric data from a user associated with the device;
   generating a token, by the device, in response to receiving the communication, wherein the token comprises the biometric data and at least one of a personal identification number (PIN), an alphanumeric value, a code word, a pass phrase, and a security question;
   transmitting, by the device, the generated token to the server associated with the financial institution entity;

receiving, by the device, evidence data from the server, wherein the evidence data is indicative that the token was received by the server; and establishing, by the device, a communication channel with the server in response to receiving evidence data of the token.

2. The method of claim 1, wherein the evidence data comprises the token, a portion of the token, or a response to the token.

3. The method of claim 1, further comprising:

requesting, by the device, that the server respond with evidence of the token.

4. The method of claim 1, further comprising:

sending, by the device, registration data to the server, wherein the registration data associates the device with the user.

5. The method of claim 1, wherein the communication request is received on a communication channel that is a first digital channel, and wherein the token is transmitted on authentication channel that is a second digital channel.

6. The method of claim 5, wherein the first digital channel is different from the second digital channel.

7. The method of claim 1, wherein the token comprises a one-time passcode.

8. A system, comprising non-transitory computer-readable medium storing computer-executable instructions that when executed by a computer cause the computer to perform operations, the operations comprising:

receiving, by a device comprising a processor, a communication request from a server associated with a financial institution;

receiving a request to generate a token;

collecting biometric data from a user associated with the device;

generating a token that comprises the biometric data and a variable element;

transmitting the generated token to the server associated with the financial institution; and establishing, by the device, a communication channel with the server in response to receiving an indication the token was received by the server.

9. The system of claim 8, the operations further comprising:

sending, by the device, registration data to the server, associating the user with the device.

10. The system of claim 9, wherein the sending the registration data further comprises:

receiving at least one of user data and device data from the user via the device;

storing the at least one of user data and device data.

11. The system of claim 8, the operations further comprising:

sending a request to verify the token was received by the server; and receiving evidence of the token from the server.

12. The system of claim 11, wherein the evidence comprises the token, a portion of the token, or a response to the token.

13. The system of claim 8, wherein the token comprises personal identification number (PIN), alphanumeric value, code word, pass phrase, or a security question.

14. A device, the device comprising:

a token logic configured to generate a token based on biometric data received from a sensor on the device in response to receiving a communication request from the entity, wherein the token comprises the biometric data, and at least one of a personal identification number (PIN), a alphanumeric value, a code word, a pass phrase, and a security question; and a communication logic configured to send the token to the a server associated with a financial institution entity, and establish a communications channel with the server in response to receiving an indication that the token was received by the server.

15. The device of claim 14, further comprising:

a registration interface configured to facilitate registering a device with the server.

16. The device of claim 14, wherein the communication channel is on a first digital channel, and wherein the token is transmitted on an authentication channel that is a second digital channel.

17. The device of claim 16, wherein the first digital channel is different from the second digital channel.

18. The device of claim 14, wherein the indication the token was received comprises evidence data comprising at least one of the token, a portion of the token, or a response to the token.

19. The device of claim 14, wherein the token further comprises location information received from a location sensor on the device.

20. The device of claim 19, wherein the token logic includes the location information in response to the device being within a predetermined location.

* * * * *